US006556816B1

(12) United States Patent
Gafrick et al.

(10) Patent No.: US 6,556,816 B1
(45) Date of Patent: Apr. 29, 2003

(54) METHOD AND APPARATUS FOR RE-ESTABLISHING A CALL IN A COMMUNICATION SYSTEM

(75) Inventors: John Matthew Gafrick, Naperville, IL (US); Jeffrey Arthur Zahnle, Elburn, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/494,267

(22) Filed: Jan. 31, 2000

(51) Int. Cl.$^7$ ................................................ H04Q 7/00
(52) U.S. Cl. .......................................... 455/404; 379/45
(58) Field of Search ................................. 455/433, 404, 455/422, 458, 423, 424, 425; 340/7.51; 379/45

(56) References Cited

U.S. PATENT DOCUMENTS 5,689,548 A * 11/1997 Maupin et al. ............... 379/45
5,712,900 A * 1/1998 Maupin et al. .............. 455/433
5,937,344 A * 8/1999 Zicker ......................... 455/404
6,148,190 A * 11/2000 Bugnon et al. .............. 455/404
6,240,284 B1 * 5/2001 Bugnon et al. .............. 455/404

FOREIGN PATENT DOCUMENTS

EP          0871316 A1  * 10/1998

* cited by examiner

Primary Examiner—Nguyen T. Vo
Assistant Examiner—David Q. Nguyen
(74) Attorney, Agent, or Firm—John B. MacIntyre

(57) ABSTRACT

The present invention provides a method and Mobile Switching Center (MSC) for re-establishing a call in a communication system. The MSC receives from a network element a callback request to re-establish a call, such as an emergency call, between the network element and a mobile unit. The callback request includes a callback number. The MSC determines whether the callback number can be used to alert the mobile unit. If the callback number cannot be used to alert the mobile unit, the MSC determines an identification number of the mobile unit. The MSC then alerts the mobile unit by utilizing the identification number of the mobile unit and re-establishes the call on the original call path between the mobile unit and the network element.

15 Claims, 5 Drawing Sheets

METHOD AND APPARATUS FOR RE-ESTABLISHING A CALL IN A COMMUNICATION SYSTEM

FIELD OF THE INVENTION

The present invention relates generally to communication systems, and more particularly to a method and apparatus for re-establishing a call in a communication system.

BACKGROUND OF THE INVENTION

Emergency service is widely provided as 9-1-1 service where a caller can reach emergency services such as police, fire, ambulance or the like by dialing 9-1-1. Enhanced 9-1-1 service provides the entity responsible for handling the emergency call, commonly referred to as the Public Safety Answering Point (PSAP), with the calling party's location, directory number and other information related to the calling party. The PSAP is an emergency services network element that is responsible for answering emergency calls. Providing this information to the PSAP assists the PSAP in attempting to locate the calling party even if the calling party is unable to identify his or her location. This information also facilitates in re-establishing contact with the calling party if the original emergency call is terminated. Thus, the ability of a communication system to provide enhanced 9-1-1 service dramatically improves public safety.

In a typical landline 9-1-1 service application, an Automatic Number Identification (ANI) is associated with each customer landline phone such that there is a one to one relationship between ANI numbers and customer locations. When a calling party's 9-1-1 emergency call is forwarded to the selective router switching system serving the 9-1-1 call, the call setup message includes the ANI number. An ANI data base, accessible by the selective router switching system, maintains a mapping of ANI numbers to emergency service areas. Specifically, the geographic area served by the switching system is divided into emergency service zones (ESZs) where each ESZ encompasses a portion of the customers hosted by the switching system. Thus, every ANI number is correlated with one of the ESZs, although each ESZ typically serves many ANI numbers. The switching system, after identifying the appropriate ESZ from the ANI data base, forwards the emergency call to the PSAP responsible for that ESZ. The ANI number is also forwarded to the PSAP in the call setup message.

While the above-described system works well for landline telephones, it is not possible to process emergency calls from mobile wireless devices in the same manner. Because mobile wireless communication devices are by definition not tied to a particular customer location, an ANI number for the mobile device cannot be translated to the present location of the device (the ANI number for a mobile device is typically correlated to the customer's billing address).

Some mobile units are incapable of receiving incoming calls. This can happen when a mobile unit has roamed and does not have call delivery, when the mobile unit is a non-coded mobile unit, if the mobile service is discontinued, or if no roaming relationship exists between the service provider and the mobile unit's home system. Using traditional 9-1-1 processing, the directory number of the mobile unit will be passed to the PSAP during the setup of the emergency call. If the emergency call is terminated and the PSAP desires to re-establish the emergency call, it will try to contact the mobile unit using the directory number of the mobile unit. Consequently, since the mobile unit is not able to be contacted via its directory number, the PSAP will fail in its attempt to re-establish the emergency call.

The problem of re-establishing a call is also true in a non-emergency setting. Therefore, a need exists for a method and apparatus for re-establishing a call, and more particularly an emergency call, where the directory number associated with the call is not effective in re-establishing the call.

SUMMARY OF THE INVENTION

It is an object of the present invention to provide a method and apparatus for enabling a called party to re-establish a call, and more particularly an emergency call, that has been terminated improperly.

The method and apparatus of the present invention enables a network element, such as a PSAP, to re-establish a call, such as an emergency call, with a mobile unit when the call has been improperly terminated. The present invention can also be effective in cases when a call has been properly terminated but more information is desired after termination of the call. When establishing the call, the MSC to which the mobile unit is connected determines if the mobile unit can be contacted using its directory number. If the mobile unit cannot be contacted with its directory number, the MSC associates the identification number of the mobile unit with a callback number. The MSC stores the identification number of the mobile unit with the callback number. The MSC establishes the call between the mobile unit and a network element, such as a PSAP, and includes the callback number in the setup of the call, similar to typical 9-1-1 processing.

If the call is improperly terminated, the present invention allows for the call to be re-established, preferably on the same call path, even if the mobile unit is one that cannot be reached using its directory number. The call may have terminated improperly due to the mobile unit temporally going into an area that does not provide cellular coverage, temporary loss of power, or any other situation where the link to the mobile unit is dropped, but the call was not desired to be ended by the called party. In typical emergency calls, the network element makes the decision to end the call, and it is upon communication of this decision to the MSC that the resources used for the emergency call are typically released.

If the call is improperly terminated, the network element will attempt to re-establish the call using the callback number passed during initial connection. Since the callback number is typically the directory number of the mobile unit, and because in this case the mobile unit cannot be reached by the directory number, this attempt to re-establish the call will be unsuccessful.

However, utilizing the present invention allows for calls to be re-established, preferably on the same call path, even in situations when the mobile unit that was a part of the original call has dropped out of the call and cannot be reached using its directory number. The MSC receives a request from the network element to re-establish the call. The MSC determines that the mobile unit cannot or should not be reached using the directory number of the mobile unit. This will preferably be done by comparing the callback number to a list of known callback numbers at the MSC that are used when the mobile unit cannot be contacted using its directory number.

The MSC then determines a way of contacting the mobile unit using means other than the directory number. The preferred method is to retrieve the Mobile Identification Number (MIN) for the mobile unit and then page the mobile unit using the MIN. Alternately, the International Mobile Station Identifier (IMSI) may be used. Once the MSC has contacted to mobile unit, the call can be re-established on the original call path.

Thus, the present invention provides an improved method and apparatus for re-establishing a call in a communication system.

DESCRIPTION OF THE PREFFERED EMBODIMENT(S)

Figure 1:
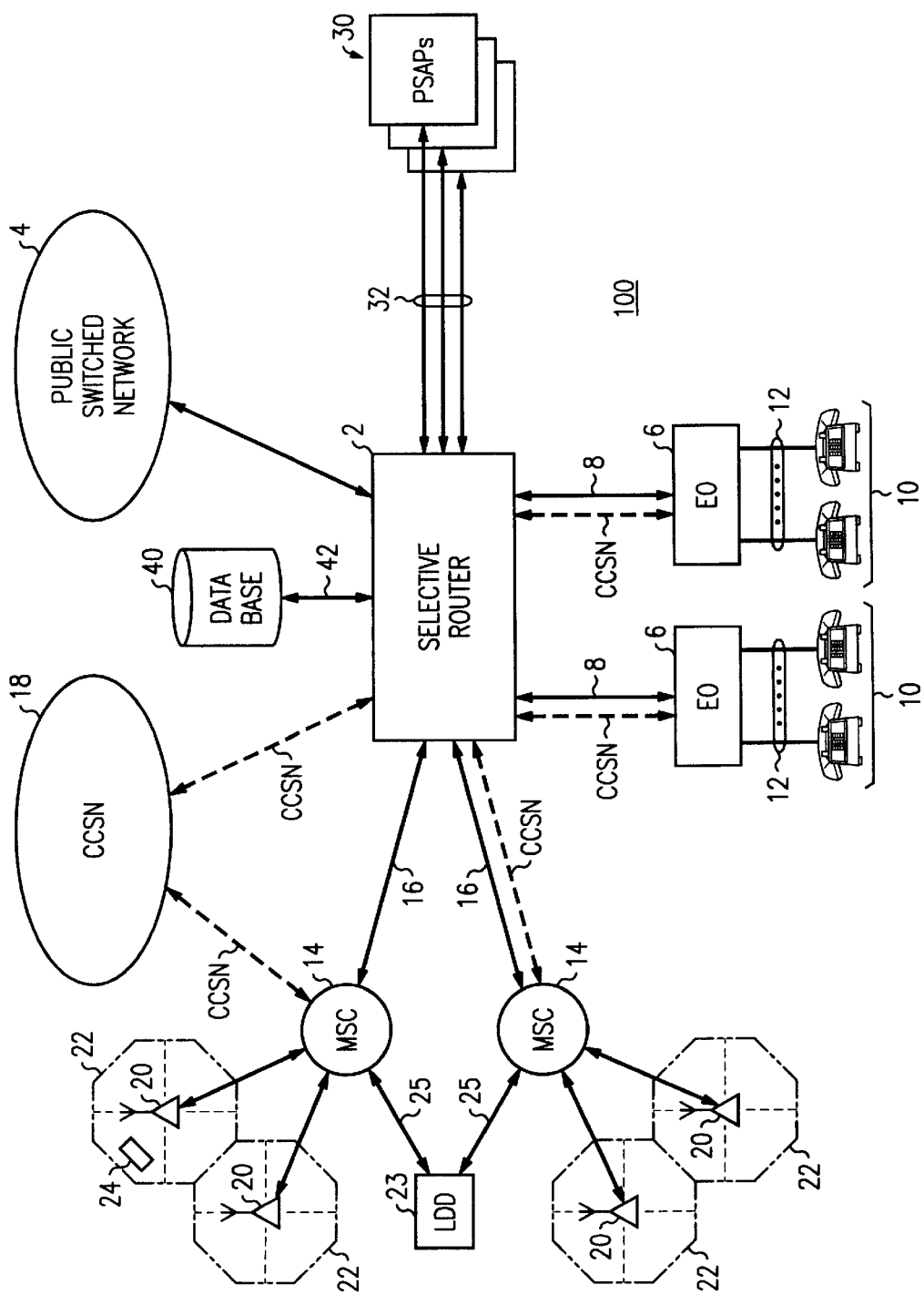
FIG. 1 depicts a communication system in accordance with the preferred embodiment of the present invention.

FIG. 1 depicts a communication system 100 in accordance with the preferred embodiment of the present invention. Communication system 100 comprises a switching system 2, such as the "5ESS" switching system manufactured and sold by "LUCENT TECHNOLOGIES, INC.". In the illustrated system 100, switching system 2, commonly known as a selective router, is an emergency services network element responsible for routing an incoming emergency call to an appropriate Public Safety Answering Point (PSAP) 30. Switching system 2 may also be responsible for other functions, such as redirecting calls from a primary PSAP to a secondary PSAP and can include any switch having a switch fabric capable of routing voice and data through Public Switch Telephone Network (PSTN) 4.

Selective router 2 is typically connected to one or more end offices 6 via trunks 8. End offices 6 can comprise switching systems such as the "5ESS" switching system or any switch capable of routing voice and data through the network. End offices 6 preferably host Customer Premise Equipment (CPE) 10 such as telephones, personal computers, fax machines or the like over customer lines 12. Selective router 2 is also preferably connected to one or more Mobile Switching Centers (MSC) 14 over trunks 16. It will be appreciated that end offices 6 can also host MSCs. As is known in the art, MSCs 14, end offices 6 and selective routers 2, in addition to the voice and data communications channels described above, communicate with one another over an overlay Common Channel Signaling Network (CCSN) 18, preferably the SS7 network for transmitting control and signal messaging. The CCSN can connect the network elements directly using a point-to-point connection, or the connection can be made through the CCSN network as illustrated.

Each MSC 14 is preferably connected to at least one cell site 20 comprising a radio transceiver 20. Radio transceiver 20 is effective for establishing an air interface with wireless communication devices 24 located in cell 22 served by cell site 20. It is to be understood that in a typical wireless communication system, cell sites are arranged such that the cells are contiguous, thereby allowing wireless communication devices 24 to move between cells 22. In the system of the present invention, each cell is divided into sectors 22a, 22b . . . 22n where each cell sector encompasses a predetermined geographic area of the cell.

Selective router 2 is preferably connected to a plurality of PSAPs 30 over interfaces 32. In the preferred embodiment, interfaces 32 comprise Integrated Services Digital Network (ISDN) interfaces, although analog interfaces can also be used. In the communication system of the present invention, the routing of a call is different for the two interfaces as will hereinafter be explained. Each PSAP 30 is responsible for administering emergency calls forwarded to it from selective router 2. Specifically, each PSAP 30 is responsible for serving calls that originate from a particular geographic area. The geographic areas served by PSAPs 30 are known as emergency service zones (ESZs). Selective router 2, as will hereinafter be explained, routes the call to the PSAP serving the geographic area from which the emergency call originates. The PSAP, after being connected to the calling party, serves the call by advising police, fire or other emergency personnel of the nature of the call or by taking other action as appropriate.

Communication system 100 also includes a data base 40 accessible by selective router over data link 42. As is known, data base 40 includes a correlation between ANI numbers and Emergency Service Zones (ESZs) for land line calls so that selective router 2, upon receipt of an ANI from a land line CPE 10, can identify the emergency service zone for that call and direct the call to the PSAP serving that ESZ.

Figure 2:
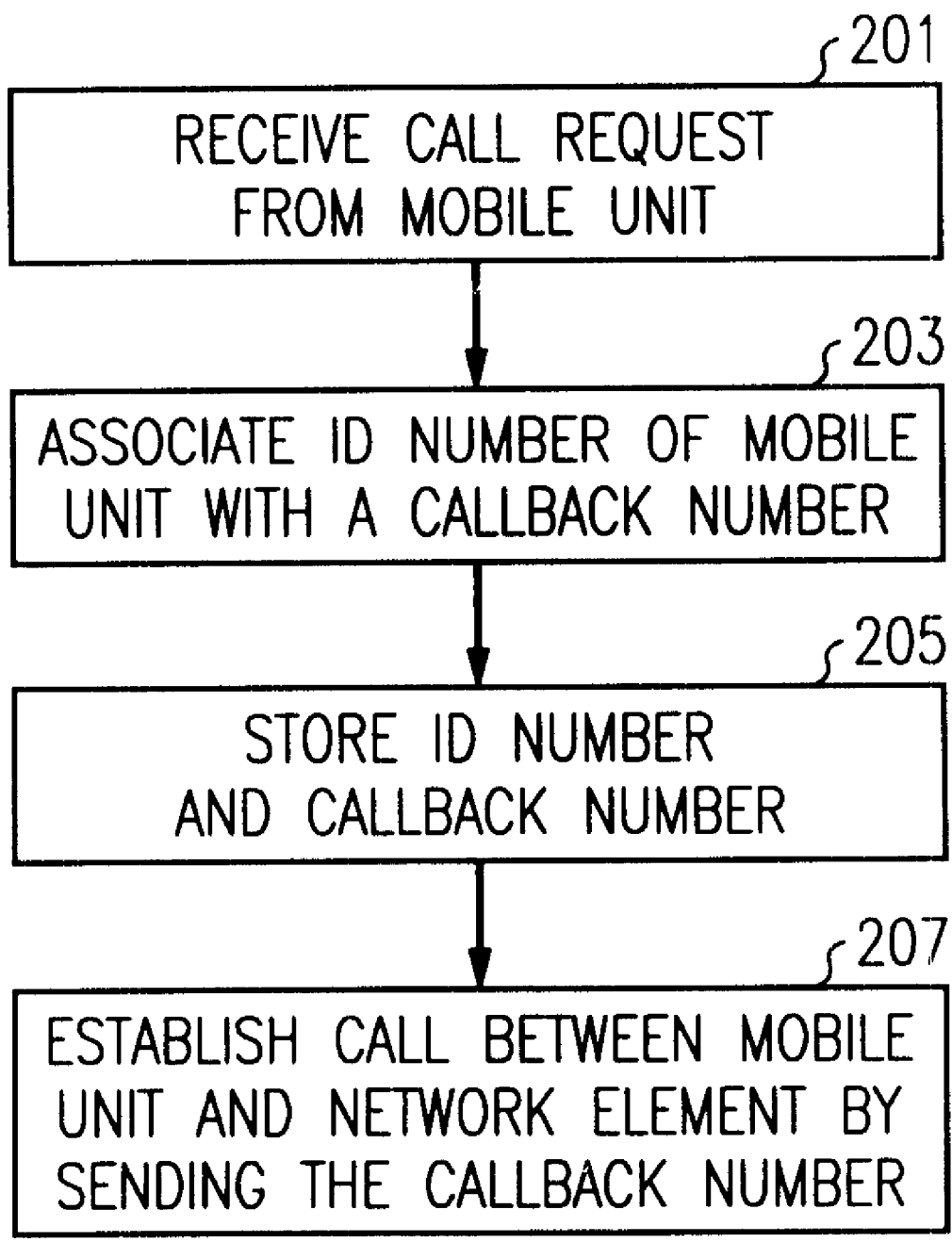
FIG. 2 depicts a flowchart for establishing a call in a communication system in accordance with the preferred embodiment of the present invention.

FIG. 2 depicts a flowchart for establishing a call in a communication system in accordance with the preferred embodiment of the present invention. The processing depicted in FIG. 2 preferably occurs at a Mobile Switching Center (MSC), but could alternately be located at another location, or could have some steps performed at the MSC and others performed in another piece of telecommunications equipment.

The MSC receives (201) a request from a mobile unit having a directory number. In the preferred embodiment of the present invention, the request is a request for an emergency call. In an alternate embodiment of the present invention, the request received by the MSC is a request for a non-emergency communication. The MSC checks to see if the mobile unit can be reached using its directory number. MSC local policy determines if a callback number is issued. Parameters considered by the MSC include whether the mobile unit is fraudulent, whether the mobile unit has a valid directory number, whether a roaming relationship exists with the HLR, and whether a callback number is always issued. The request preferably includes an identification number associated with the mobile unit and preferably includes the directory number of the mobile unit and a Mobile Identification Number (MIN) associated with the mobile unit. Alternately, the request can include the International Mobile Station Identifier (IMSI) associated with the mobile unit.

If the mobile unit cannot be contacted using its directory number, the MSC associates (203) the identification number of the mobile unit with a callback number. The callback number is different than the directory number of the mobile unit. In the preferred embodiment, the MSC associates the MIN or IMSI of the mobile unit with an Emergency Services Callback Number (ESCN).

The MSC then stores (205) the identification number and the callback number. The MSC, in storing the identification number of the mobile unit and the callback number, associates the two so that the identification number can be obtained by retrieving the callback number. In the preferred embodiment, the MSC stores the MIN and the ESCN.

The MSC establishes (207) a call between the mobile unit and a network element by sending the callback number to the network element. In the preferred embodiment, the MSC sends the ESCN to the network element. The call is established on a call path. As used herein, the term "call path" refers to the links that are necessary to facilitate a communication between the mobile unit and the network element. This path typically includes trunking from the MSC to the selective router.

After step 207, a call is established between the mobile unit and the network element. In the preferred embodiment, the call is an emergency call. The call is established with a callback number that is different from the directory number of the mobile unit. The callback number is preferably included in the calling number field of the ISUP initial address message (IAM). In the preferred embodiment, the IAM's emergency service indicator is set showing that the call is an emergency call. The IAM populated with the call back number and the emergency service indicator is forwarded to the selective router over the common channel signaling network (CCSN) to set up the call. While specific fields in the IAM have been described, it will be appreciated that the actual fields populated with this information can vary.

In this manner, as will be shown with regards to FIGS. 3 and 4 below, the network element will be able to re-establish the call with the mobile unit, for instance, in the situation when the mobile unit improperly drops the call.

Figure 3:
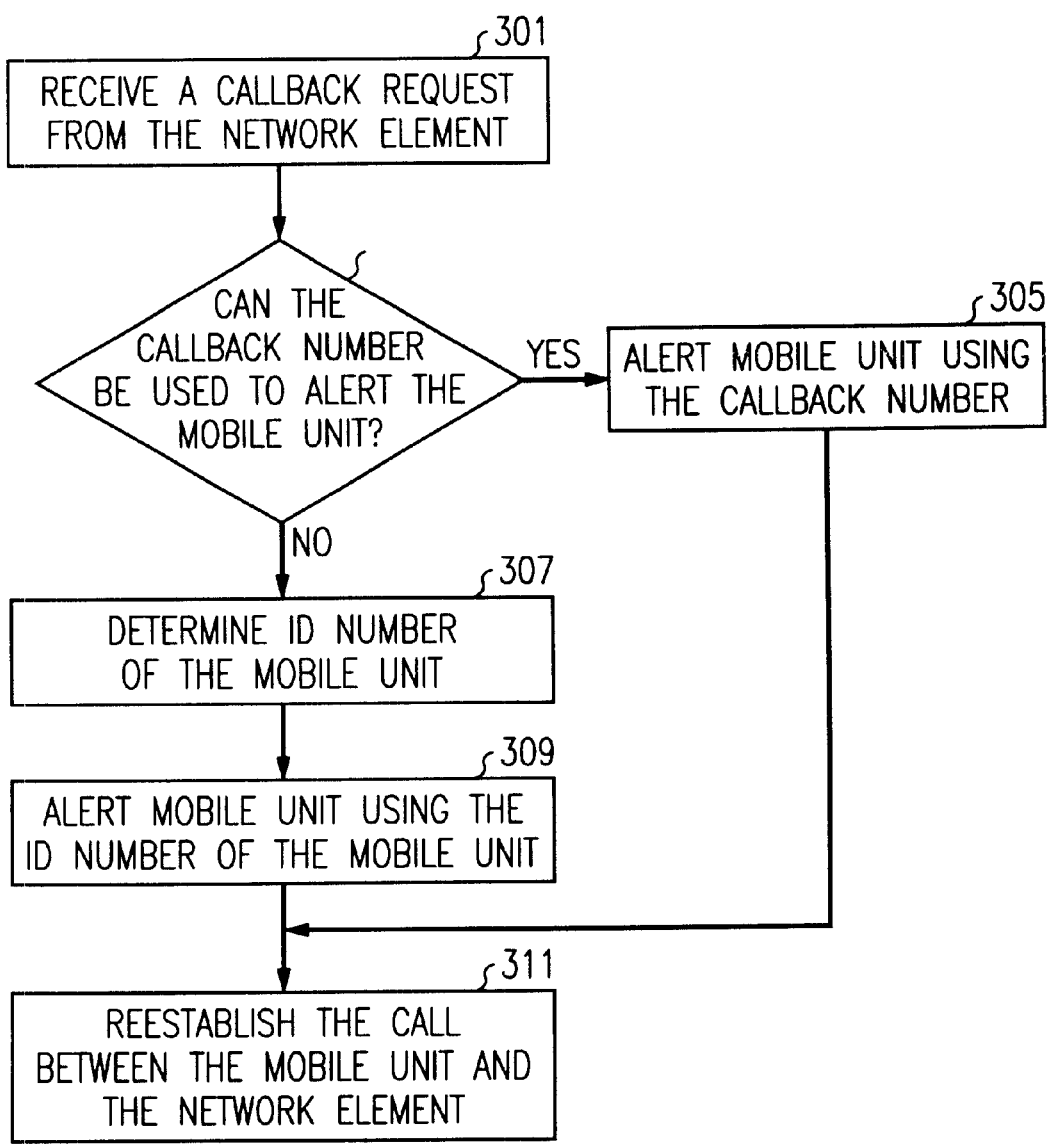
FIG. 3 depicts a flowchart for re-establishing a call in a communication system in accordance with the preferred embodiment of the present invention.

FIG. 3 depicts a flowchart for re-establishing a call in a communication system in accordance with the preferred embodiment of the present invention. In the preferred embodiment, the call is an emergency call. Similar processing occurs for the alternate embodiment, when the call is a non-emergency call. A determination is made that the call between the network element and the mobile unit has terminated improperly. For instance, the mobile unit may have gone into a "dead zone", a cell area that is uncovered, thereby breaking down one of the links of the call. Typically, the network element initiates the termination of an emergency call. If the mobile unit initiates the termination of the call, it typically means that the emergency call should not have been terminated, but rather was improperly terminated due to a circumstance such as the mobile user entering a "dead zone".

In the preferred embodiment of the present invention, the call is not broken down until the network element instructs the MSC to place all of the links it controls necessary to establish the call path back into service for other calls. The MSC preferably keeps the portion of the call path between it and the network element up and does not release these resources until instructed to do so by the network element. In this manner, the present invention allows for the call to be re-established on the same call path as the original call.

In accordance with the preferred embodiment, the MSC receives (301) a callback request to re-establish the call between the network element and a mobile unit. The callback request preferably comes from the network element and preferably includes the callback number. In the preferred embodiment, the callback request includes the ESCN.

The MSC then determines (303) whether the callback number can be used to alert the mobile unit. In the preferred embodiment of the present invention, the MSC makes this determination by checking the callback number against a predetermined list of callback numbers stored at the MSC. If the callback number sent from the network element matches one of these predetermined callback numbers, the MSC knows that the mobile unit that the network element is attempting to contact cannot be contacted using the callback number sent from the network element. In an alternate embodiment of the present invention, the MSC can try to page the mobile unit associated with the callback number. If the callback number is one that is not associated with a mobile unit, the page will not be answered. The MSC can then determine an alternate way of contacting the mobile unit. A first way of contacting the mobile unit would be to look up the callback number in a table to determine the identification number of the mobile unit associated with this callback number. The MSC could then page the mobile unit using the identification number of the mobile unit.

If the MSC determines that the callback number can be used to alert the mobile unit, the MSC alerts (305) the mobile unit by sending an alert message that includes the callback number passed to it from the network element. The MSC then proceeds to step 311, which is described in detail below.

If the MSC cannot use the callback number to alert the mobile unit, the MSC will determine (307) the identification number of the mobile unit. The MSC preferably makes this determination by retrieving a record that includes the callback number and an identification number of the mobile unit. In the preferred embodiment of the present invention, the MSC retrieves the emergency services callback number (ESCN) to obtain the Mobile Identification Number (MIN) or IMSI of the mobile unit.

The MSC then alerts (309) the mobile unit by utilizing the identification number of the mobile unit. The MSC preferably accomplishes this by paging the mobile unit using the identification number of the mobile unit.

Figure 4:
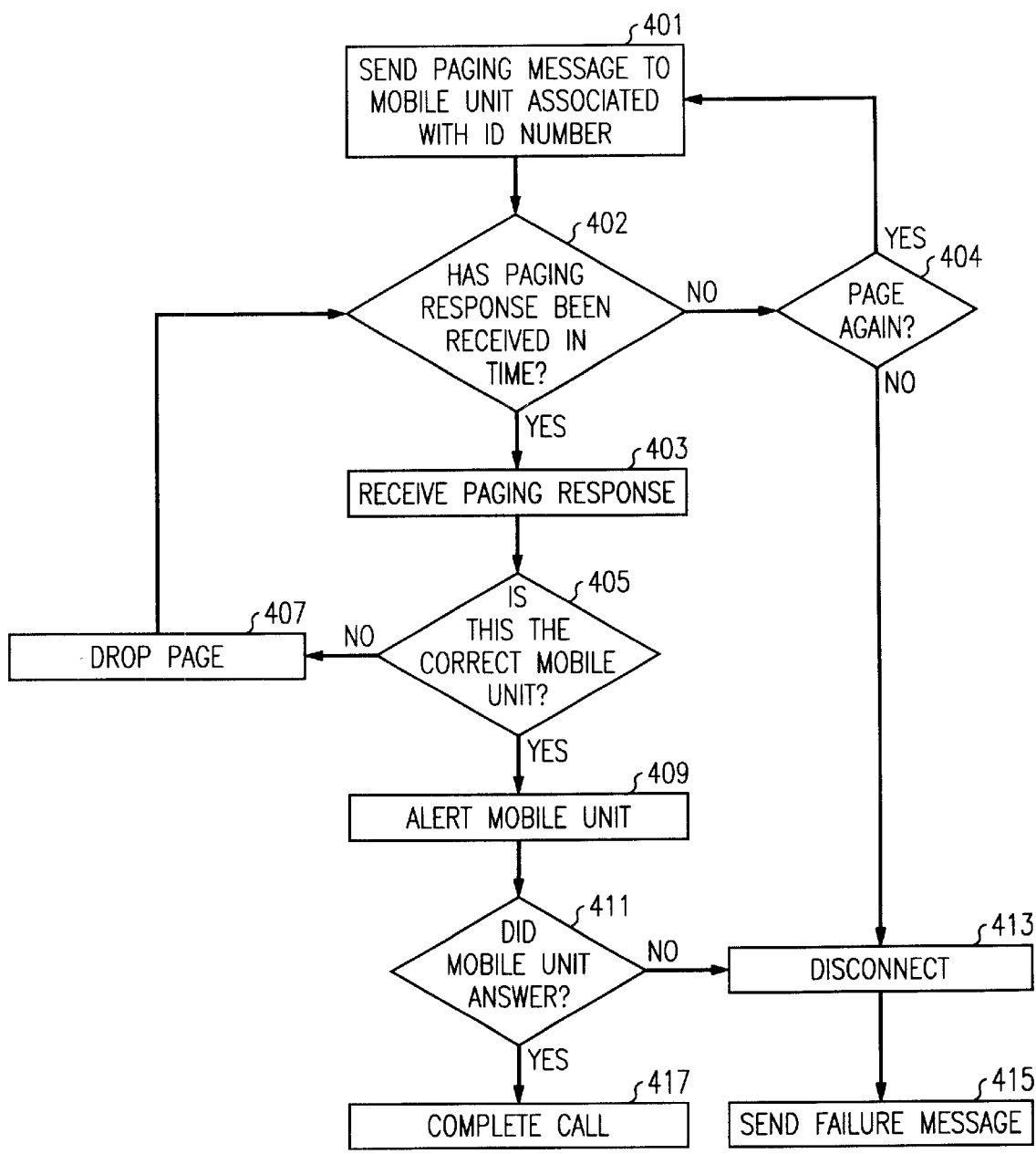
FIG. 4 depicts a flowchart of the re-establishing step for re-establishing a call in a communication system in accordance with the preferred embodiment of the present invention.

The MSC then re-establishes (311) the call between the mobile unit and the network element on the call path used for the original call, preferably by using the identification number of the mobile unit, as described in more detail in FIG. 4.

FIG. 4 depicts a flowchart of the re-establishing step for re-establishing a call in a communication system in accordance with the preferred embodiment of the present invention.

The MSC sends (401) a paging message to the mobile unit associated with the identification number. If the callback number can be used to alert the mobile unit, the callback number will be used as the identification number. If the callback number cannot be used to alert the mobile unit, the Mobile Identification Number (MIN) will be used. Alternately, the IMSI or Electronic Serial Number (ESN) may be used to alert the mobile unit.

The MSC determines (402) if a paging response has been received in the allowed time. The MSC preferably makes this determination by starting a timer and sensing that the timer has expired. If the timer expires prior to receiving a paging response, the MSC determines (404) whether it should page the mobile unit again per local algorithm. This algorithm preferably compares a counter that indicates the number of times that the page has been sent to a value, preferably input into the system, that indicates the maximum number of times that the mobile should be paged before it is decided that the mobile unit cannot be reached. As an example, this value can be set to three, in which case the mobile unit would be paged three times before the MSC determines that it should no longer page the mobile unit. If the MSC determines that it should not page the mobile unit again, the MSC will proceed to the disconnection steps, which are described in more detail below. If the MSC determines that it should page the mobile unit again, it returns to step 401.

If the MSC determines in step 402 that a paging response has been received in time, the MSC receives (403) a page response from a responding mobile unit. The MSC can receive multiple page responses. This could occur with mobile units that are programmed with the same ID, such as non-encoded mobile units or fraudulent mobile units.

The MSC then determines (405) if the responding mobile unit is the mobile unit that was involved in the original call. The MSC preferably makes this determination by comparing the ESN to a stored value, or the current location to a stored location.

If the responding mobile unit is not the intended mobile unit, the MSC drops (407) the paging message to this mobile unit. The MSC accomplishes this by ceasing the sending of the paging message to the responding mobile unit. The MSC then returns to receive paging responses.

If the responding mobile unit is the intended mobile unit, the MSC alerts (409) the mobile unit. The MSC preferably does this by sending an alert message to the responding mobile unit.

The MSC then determines (411) if the mobile unit responded to the alert message. If the mobile unit did not respond to the alert message, the MSC disconnects (413) the call, and sends (415) a failure message to the network element indicating that the call could not be re-established between the mobile unit and the network element. This could happen if the mobile unit has roamed out of coverage area, has lost power, or has suffered other malfunction that prevents it from communication with the MSC.

If the mobile unit did respond to the alert message, the MSC will complete (417) the call by re-establishing the call on the original call path between the mobile unit and the network element.

Figure 5:
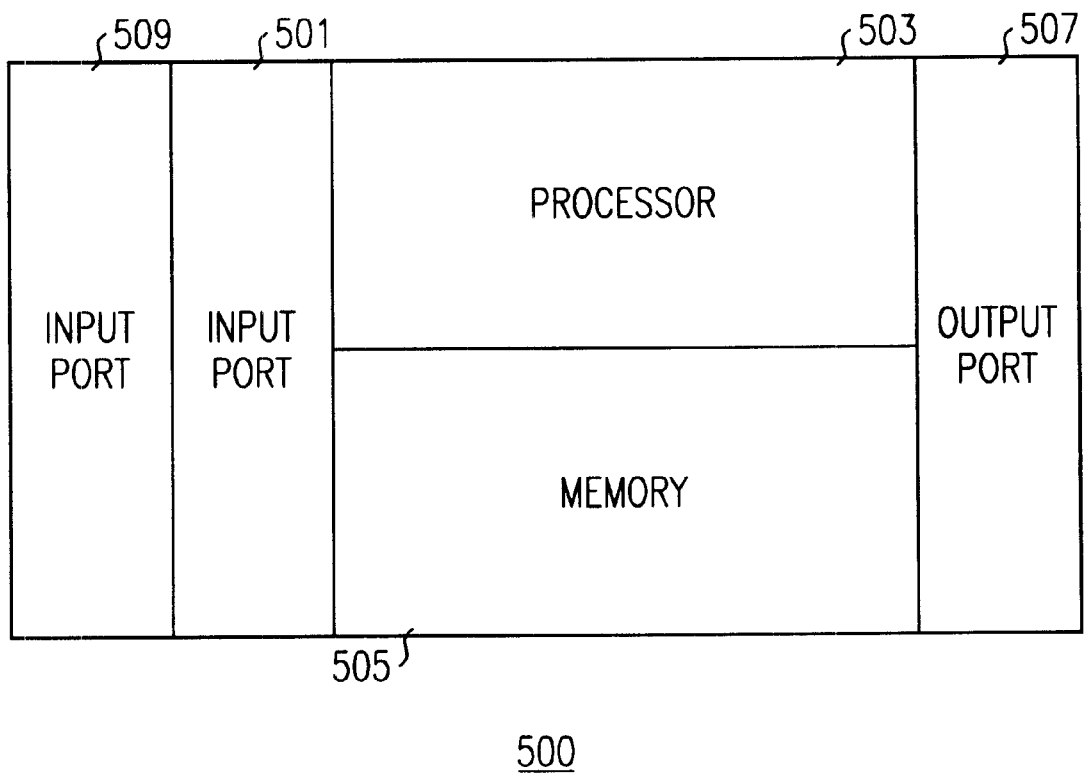
FIG. 5 depicts a Mobile Switching Center (MSC) in accordance with the preferred embodiment of the present invention.

FIG. 5 depicts a Mobile Switching Center (MSC) 500 in accordance with the preferred embodiment of the present invention. MSC 500 preferably includes a first input port 501, a processor 503, memory 505, and output port 507, and a second input port 509.

First input port 501 is effective in receiving a request, such as an emergency request, from a mobile unit having a directory number. The request preferably includes a Mobile Identification Number (MIN) or International Mobile Station Identifier (IMSI) associated with the mobile unit. First input port 501 is preferably an Ethernet connection running TCP/IP (Transmission Control Protocol/Internet Protocol). It should be understood that MSC 500 can include a plurality of input ports, but only two are depicted for clarity.

MSC 500 also includes a processor 503. Processor 503 is effective in associating the MIN or IMSI for the mobile unit with a callback number, preferably an Emergency Services Callback Number (ESCN). In the preferred embodiment of the present invention, the callback number and the directory number of the mobile unit are different. Processor 503 is also effective in retrieving the callback number to obtain the MIN or IMSI. Processor 503 is effective in re-establishing the call between the mobile unit and the network element on the same call path as the original call. Processor 503 is also effective in sending a paging message to the mobile unit associated with the identification number.

MSC 500 also includes memory 505 for storing the MIN or IMSI and the callback number. Memory 500 preferably stores the MIN or IMSI and the callback number in such a way that the fields are correlated, such that the callback number can be used to obtain the associated MIN or IMSI and the MIN or IMSI can be used to obtain the associated callback number.

MSC 500 also includes an output port 507 that is effective in sending the callback number to the network element to facilitate the establishment of a call between the MSC and the network element. Output port 507 is preferably running Integrated digital Services network User Part (ISUP), but can alternately be an Ethernet connection running TCP/IP.

MSC 500 also preferably includes a second input port 509 that is effective in receiving a callback request from the network element to re-establish the call. Second input port 509 is preferably an Ethernet connection running TCP/IP. The callback request preferably includes the callback number, such as the ESCN.

Thus, the present invention provides a method and apparatus that solves a problem associated with the prior art. The preferred embodiment of the present invention provides a method for re-establishing a call, such as an emergency call, in a communication system. The call is preferably re-established on the same call path. The MSC associates an identifier associated with the calling party with a callback number and stores the callback number and the identifier. The identifier is preferably the Mobile Identification Number (MIN). Alternately, the identifier is the IMSI. If the call is improperly terminated, which typically refers to the situation when the mobile unit ends an emergency call, the call can be re-established utilizing the method of the present invention.

To re-establish the call, the MSC receives a callback request from a network element. The callback request preferably includes the callback number. In situations where the mobile unit cannot be called back using its directory number, the MSC can then use the callback number to obtain the identification number of the mobile unit. The MSC can use the identification number of the mobile unit to alert the mobile unit that the network element is attempting to re-establish the call. When the mobile unit responds to the alerting by the MSC, the MSC re-establishes the call between the network element and the mobile unit.

The present invention thereby provides a method and apparatus for re-establishing a call that has been prematurely terminated for a mobile unit that cannot be reached using its directory number.

It should be understood that there are other parameters that can be used to identify the mobile unit other than the Mobile Identification Number. These include, but are not limited to, the Electronic Serial Number (ESN), location information, or the International Mobile Station Identifier (IMSI). Further, the method of the present invention could also be used for calls other than emergency calls. For instance, the MSC could store the MIN of a mobile unit, or any other value that uniquely identifies the mobile unit, such as the IMSI, prior to completing a cellular call.

A further embodiment of the present invention can restore premature terminations for packet-based calls. One example of such a call is a voice call that is disconnected due to a packet or path failure when the caller is not at their preprogrammed Internet Protocol (IP) address. For example, a user of an IP connection, such as on the Internet, could be engaged in a call to a sales or customer service representative. If the call is terminated prematurely, the called party could re-establish the call with the calling party. This would be beneficial where the called party would like to continue the conversation, and the calling party is not at their preprogrammed IP address.

In such an embodiment, the calling party establishes the call, preferably by connecting to a Packet Data Gateway (PDG). The PDG routes packets to and from the calling party and the called party. If the call is terminated, the called party sends a message to the PDG indicating that it would like to re-establish the call. The PDG would then re-establish the call, preferably by sending an alert message to the calling party, and then re-establishing the call when the calling party responds to the alerting message.

While this invention has been described in terms of certain examples thereof, it is not intended that it be limited to the above description, but rather only to the extent set forth in the claims that follow.

We claim:

1. A method for re-establishing a call between a mobile unit and a network element in a communication system, the method comprising the steps of:
   receiving from the network element a callback request to re-establish a call between the network element and the mobile unit, the callback request including a callback number;
   determining whether the callback number can be used to alert the mobile unit;
   if the callback number cannot be used to alert the mobile unit, determining an identification number of the mobile unit;
   sending an alert message to the mobile unit associated with the identification number; and
   re-establishing the call between the mobile unit and the network element.

2. A method for re-establishing a call between a mobile unit and a network element in a communication system in accordance with claim 1, wherein the call was on a portion of a first call path, and wherein the step of re-establishing the call comprises re-establishing the call on the portion of the first call path.

3. A method for re-establishing a call between a mobile unit and a network element in a communication system in accordance with claim 1, wherein the step of re-establishing the call between the mobile unit and the network element comprises the steps of:
   sending a paging message to the mobile unit associated with the identification number;
   receiving a page response from a responding mobile unit;
   determining if the responding mobile unit is the mobile unit; and
   if the responding mobile unit is the mobile unit, sending an alert message to the responding mobile unit.

4. A method for re-establishing a call between a mobile unit and a network element in a communication system in accordance with claim 3, further comprising the steps of:
   determining if the mobile unit responded to the alert message;
   if it is determined that the mobile unit responded to the alert message, re-establishing the call between the mobile unit and the network element; and
   if it is determined that the mobile unit has not responded to the alert message, transmitting a failure message to the network element, the failure message indicating that the call could not be re-established between the mobile unit and the network element.

5. A method for re-establishing a call between a mobile unit and a network element in a communication system in accordance with claim 3, further comprising the step of, if the responding mobile unit is not the mobile unit, ceasing the sending of the paging message to the responding mobile unit.

6. A method for re-establishing a call between a mobile unit and a network element in a communication system in accordance with claim 3, the method further comprising the steps of:
   starting a timer;
   upon expiration of the timer prior to receiving a paging response, determining whether the paging message should be resent to the mobile unit associated with the identification number;
   if it is determined to resend the paging message to the mobile unit associated with the identification number, resending the paging message to the mobile unit associated with the identification number; and
   if it is determined not to resend the paging message to the mobile unit associated with the identification number, transmitting a failure message to the network element, the failure message indicating that the call could not be re-established between the mobile unit and the network element.

7. A method for establishing a call between a mobile unit and a network element in a communication system, the method comprising the steps of:
   receiving a call request from a mobile unit having a directory number, the call request including an identification number associated with the mobile unit;
   associating the identification number with a callback number, the callback number being different than the directory number;
   storing the identification number and the callback number;
   establishing a call between the mobile unit and a network element on a first call path by sending the callback number to the network element;
   determining that the call between the mobile unit and the network element has terminated;
   receiving a callback request to re-establish the call from the network element, the callback request including the callback number;
   retrieving the callback number to obtain the identification number of the mobile unit;
   utilizing the identification number to obtain the directory number of the mobile unit; and
   re-establishing the call on the first call path between the mobile unit and the network element by using the directory number of the mobile unit.

8. A method for establishing a call between a mobile unit and a network element in a communication system in accordance with claim 7, wherein the step of re-establishing the call between the mobile unit and the network element comprises the steps of:
   sending a paging message to the mobile unit associated with the directory number;
   receiving a page response from a responding mobile unit;
   determining if the responding mobile unit is the mobile unit; and
   if the responding mobile unit is the mobile unit, sending an alert message to the responding mobile unit.

9. A method for establishing a call between a mobile unit and a network element in a communication system in accordance with claim 8, further comprising the steps of:

determining if the mobile unit responded to the alert message;

if it is determined that the mobile unit responded to the alert message, re-establishing the call between the mobile unit and the network element on the first call path; and if it is determined that the mobile unit has not responded to the alert message, transmitting a failure message to the network element, the failure message indicating that the call could not be re-established between the mobile unit and the network element on the first call path.

10. A method for establishing a call between a mobile unit and a network element in a communication system in accordance with claim 8, the method further comprising the steps of:

starting a timer;

upon expiration of the timer prior to receiving a paging response, determining whether the paging message should be resent to the mobile unit associated with the directory number;

if it is determined to resend the paging message to the mobile unit associated with the directory number, resending the paging message to the mobile unit associated with the directory number; and if it is determined not to resend the paging message to the mobile unit associated with the directory number, transmitting a failure message to the network element, the failure message indicating that the call could not be re-established between the mobile unit and the network element on the first call path.

11. A method for establishing an emergency call in a communication system, the method comprising the steps of:

receiving at a Mobile Switching Center (MSC) an emergency request from a mobile unit having a directory number, the emergency request including a Mobile Identification Number (MIN) associated with the mobile unit, associating the MIN for the mobile unit with an Emergency Services Callback Number (ESCN);

storing the MIN and the ESCN;

establishing an emergency call on a first call path between the mobile unit and a network element by sending the ESCN to the network element;

determining that the emergency call between the mobile unit and the network element has terminated;

receiving a callback request to reestablish the emergency call from the network element, the callback request including the ESCN;

retrieving the ESCN to obtain the MIN of the mobile unit;

utilizing the MIN to obtain the directory number of the mobile unit; and re-establishing the emergency call utilizing the directory number of the mobile unit on the first call path between the mobile unit and the network element.

12. A method for establishing an emergency call in a communication system in accordance with claim 11, wherein the step of re-establishing the emergency call between the mobile unit and the network element comprises paging the mobile unit associated with the directory number.

13. A method for establishing an emergency call in a communication system in accordance with claim 12, further comprising the step of re-establishing the emergency call between the mobile unit and the network element on the first call path.

14. A Mobile Switching Center (MSC) comprising:

an input port effective in receiving a call request from a mobile unit having a directory number, the call request including a Mobile Identification Number (MIN) associated with the mobile unit;

a processor for associating the MIN for the mobile unit with a callback number different from the directory number memory for storing the MIN and the callback number;

an output port effective in establishing a call on a first call path between the MSC and a network element by sending the callback number to the network element;

a second input port effective in receiving a callback request to reestablish the call from the network element, the callback including the callback number; and wherein the processor is effective in retrieving the callback number to obtain the MIN, associate the MIN with the directory number, the processor being further effective in re-establishing the emergency call on the first call path utilizing the directory number.

15. A Mobile Switching Center (MSC) in accordance with claim 14, wherein the processor is effective in:

re-establishing the call between the mobile unit and the network element on the first call path; and sending a paging message to the mobile unit associated with the directory number.

* * * * *